C. FÉRY.
CALORIMETRIC BOMB.
APPLICATION FILED AUG. 17, 1912.
1,067,908.
Patented July 22, 1913.
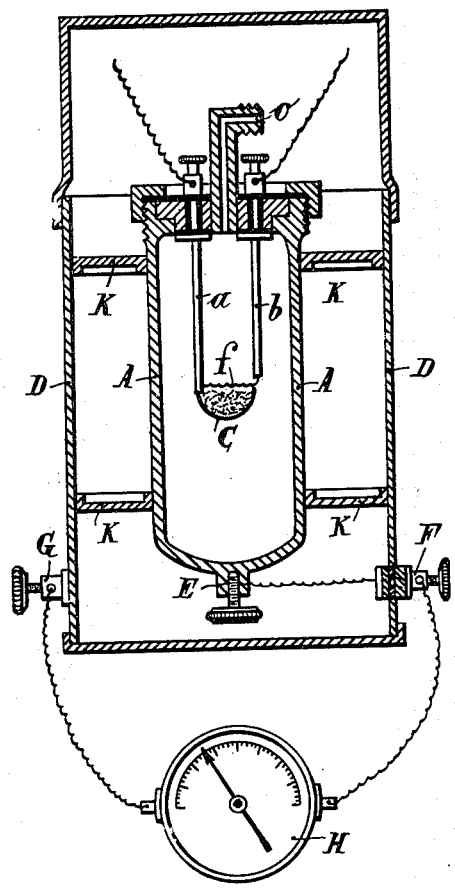
WITNESSES:
INVENTOR:
Charles Féry,
By Attorneys,

UNITED STATES PATENT OFFICE.

CHARLES FÉRY, OF PARIS, FRANCE.

CALORIMETRIC BOMB.

1,067,908.

Specification of Letters Patent. Patented July 22, 1913.

Application filed August 17, 1912. Serial No. 715,642.

*To all whom it may concern:*

Be it known that I, CHARLES FÉRY, a citizen of the Republic of France, residing in Paris, France, have invented certain new and useful Improvements in or Relating to Calorimetric Bombs, of which the following is a specification.

The object of this invention is to provide an apparatus capable of rapidly measuring the calorific power of solid, liquid or gaseous fuels or combustibles such as coal, petroleums, industrial gases and the like.

The apparatus constitutes an improvement on the calorimetric bombs of Berthelot and of Mahler. In these known apparatus, the fuel or combustible is inclosed in a very thick vessel of platinated or enameled steel into which oxygen can be compressed. The bomb itself is immersed in a calorimeter full of water, and the rise of temperature (which owing to the great calorific mass of the system is very slight) measures the required calorific power. The experiment takes some time and necessitates the employment of thermometers reading to 1/100 of a degree; moreover the results obtained have to be corrected for the cooling that takes place during the measuring operation itself. The apparatus of the present invention avoids these various drawbacks. As shown by the drawing which is a section through the apparatus, this is composed of a steel cylinder A in which the fuel or combustible is ignited in compressed oxygen (admitted at $o$) as with the old calorimetric bombs by the electric incandescence of a fine iron wire $f$ through which a current can be sent from outside. This iron wire the combustion of which produces only a negligible quantity of heat relatively to that evolved by the combustion of the coal or substance to be tested and placed in the cupel C, can be raised to incandescence by sending a current through it by the rods $a$ and $b$ which are insulated electrically from the metal of the bomb A. This latter is supported axially of an outer cylinder D of brass by two plates K of constantan or any other metal of high thermo-electric power. Constantan is an alloy of equal parts of nickel and copper. The bomb A therefore forms the hot junction of a thermo-electric couple, the cold junction of which is formed by the outer brass casing D.

To measure the difference of potential attained on heating the bomb by the combustion of the fuel, the bomb is connected to a voltmeter H by the terminal E soldered to the bomb and by the terminal F insulated from the casing D. The casing D is connected direct by the terminal G to the other terminal of the measuring instrument. Owing to the small mass of the bomb, which can weigh even less than 1 kilogram instead of 3 1/2 kilograms like the bombs of the old apparatus, and above all owing to the doing away with the large mass of water (2 kilogr. 200) which in the known apparatus is interposed between the bomb and the measuring instrument (thermometer reading to 1/100 of a degree), the indication of the measuring instrument or apparatus (voltmeter or any other device for measuring electrical energy) is very rapid with the present invention, thus dispensing with the necessity for any correction as practised with the known apparatus. Moreover with the old apparatus the product of the specific heat into the mass of the bodies employed is very large:

Bomb _____ 3 kg. 500×0.1= 350 calories
Water _____ 2 kg. 200× 1=2200 "

Total _____2550 "

With the apparatus of the present invention we only have as the product of the mass of the bomb into its specific heat:

$$1 \text{ kg. } 000 \times 0.1 = 100$$

It follows that for an equal quantity of heat evolved per gram of combustible, the rise of temperature to be measured will be inversely proportional to the calorific masses, *i. e.* the product P. C of the weight P into the specific heat C.

In existing calorimetric bombs a rise of 2° to 3° is obtained which necessitates the employment of thermometers reading to at least 1/50 of a degree to secure an accuracy of one per cent. The new apparatus will allow of obtaining a rise of temperature 25 to 30 times as great, say about 70° C. The constantan couple gives about 0 millivolt 04 per degree. The voltage obtained will therefore be 2 millivolts 8. Now it is possible to procure millivoltmeters with a pointer moving over a dial and giving a deflection of 200 millimeters for this voltage. The calorific power can thus be read at once and with great accuracy, without necessity for making any correction.

It will readily be understood from the foregoing explanation that the indications of the voltmeter are proportional to the temperature attained and consequently to the required calorific power, if the same weigh of the substance to be measured (for example 1 gram) is always taken. In order to calibrate the apparatus, therefore, it will only be necessary to measure carefully the deflection given by the combustion of one gram of a well defined substance which can be readily obtained chemically pure. Pure carbon produced by the calcination of sugar or naphthalene are in this category. We will take 9690 calories as the calorific value of the latter substance. It will then suffice to divide into 969 parts the length between the zero of the dial and the point obtained in the calibration, so that each division will represent 10 calories. The heat of combustion of industrial coals being between 7000 and 8500 calories, an error of one division will therefore only give an errer of 1/800= 0.12 per cent., a degree of accuracy which is more than sufficient for practical requirements. This invention therefore provides an industrial calorimeter capable of giving at once by direct reading and without calculation, the calorific power of solid, liquid and even gaseous combustibles. In the case of gaseous combustibles a given volume of the gas mixed with an excess of oxygen will be compressed into the bomb. This result is obtained by the dispensing with the water employed around the bomb with the old calorimetric bomb apparatus and by measuring the temperature of the bomb by a thermo electric method which at once gives the temperature of the metal at the point of contact without the heat having to pass through the water, which is a bad conductor of heat and requires to be constantly agitated throughout the duration of the measuring or testing operation which occupies about 10 minutes.

Claims:

1. A calorimetric bomb comprising a steel cylinder in which a combustible is adapted to be ignited in compressed oxygen, an outer brass cylinder, a fine iron wire adapted to be heated to ignite said combustible, means for supporting said cylinder axially of the said outer cylinder of brass without interposition of a mass of water, said means comprising parts of high thermo electric power, the arrangement being such that the bomb forms the hot junction of a thermo-electric couple the cold junction of which is formed by the outer brass casing.

2. A calorimetric bomb comprising a steel cylinder in which a combustible is adapted to be ignited in compressed oxygen, an outer brass cylinder, a fine iron wire adapted to be heated to ignite said combustible, means for supporting said cylinder axially of the said outer cylinder of brass without interposition of a mass of water, said means comprising parts of high thermo electric power, the arrangement being such that the bomb forms the hot junction of a thermo-electric couple the cold junction of which is formed by the outer brass casing, and an apparatus for measuring electric energy, graduated in calories, and the terminals of which are connected to the thermo-electric element formed by the system composed of the bomb and outer cylinder.

3. A calorimetric bomb comprising a container, a metallic envelop surrounding said container, said container having substantially solid walls, and an interposed portion composed of a body of appreciable thermoelectric power communicating directly with said container and envelop without the interposition of a mass of water, in which the container forms the hot junction and the envelop the cold junction of a thermo-electric couple, the value of the electro-motive force developed being the measure of the calorific power.

4. A calorimetric bomb comprising a cylinder, a casing, and an intervening part of a material of an appreciable thermo electric power, whereby the cylinder and intervening material form the hot junction and the intervening material and casing form the cold junction of a thermo electric couple, the value of the electromotive force generated by which is a measure of the calorific value of the combustible.

5. A calorimetric bomb comprising a cylinder, a casing, and an intervening support of a material of an appreciable thermo electric power, whereby the cylinder and intervening material form the hot junction and the intervening material and casing form the cold junction of a thermo electric couple, the value of the electromotive force generated by which is a measure of the calorific value of the combustible.

In witness whereof, I have hereunto signed my name in the presence of two subscribing witnesses.

CHARLES FÉRY.

Witnesses:
H. C. COXE,
RENÉ BARDY.